(12) United States Patent
Auvenshine (10) Patent No.: US 6,725,238 B1
(45) Date of Patent: Apr. 20, 2004

(54) METHOD, SYSTEM, AND PROGRAM FOR USING A REMOTELY ACCESSED DESKTOP INTERFACE AND NETWORK DRIVE TO ACCESS A SHARED FILE SYSTEM

(75) Inventor: John Jason Auvenshine, Tucson, AZ (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/478,941

(22) Filed: Jan. 6, 2000

(51) Int. Cl.[7] ............................................. G06F 12/00
(52) U.S. Cl. ................... 707/200; 707/205; 707/104.1; 345/733; 345/740; 345/748; 345/749; 345/751
(58) Field of Search ................................ 345/733–739, 345/751–753, 757–759, 760–763, 775, 749, 748, 790; 707/200, 205, 104.1

(56) References Cited

U.S. PATENT DOCUMENTS

| | | | | |
|---|---|---|---|---|
| 5,107,443 A | * | 4/1992 | Smith ......................... | 701/202 |
| 5,530,899 A | | 6/1996 | MacDonald | |
| 5,720,029 A | | 2/1998 | Kern et al. | |
| 5,760,771 A | * | 6/1998 | Blonder et al. ............. | 345/705 |
| 5,796,396 A | * | 8/1998 | Rich .......................... | 345/741 |
| 5,831,610 A | * | 11/1998 | Tonelli et al. .............. | 345/735 |
| 5,832,526 A | | 11/1998 | Schuyler | |
| 5,901,228 A | | 5/1999 | Crawford | |
| 5,923,737 A | * | 7/1999 | Weishut et al. ............ | 345/753 |
| 6,108,712 A | * | 8/2000 | Hayes, Jr. ................... | 709/246 |
| 6,249,281 B1 | * | 6/2001 | Chen et al. ................. | 345/753 |
| 6,253,114 B1 | * | 6/2001 | Takihara ..................... | 700/83 |
| 6,385,729 B1 | * | 5/2002 | DiGiorgio et al. .......... | 713/172 |
| 6,401,134 B1 | * | 6/2002 | Razavi et al. ............... | 345/808 |
| 6,401,178 B1 | * | 6/2002 | Gagne et al. ............... | 711/162 |
| 6,407,752 B1 | * | 6/2002 | Harnett ....................... | 345/744 |

FOREIGN PATENT DOCUMENTS

WO       9927679       6/1999

OTHER PUBLICATIONS

Mark Brown, Special edition Using Netscape 2, Que, ©1995, pp. 170–178 and 895–901.*

(List continued on next page.)

Primary Examiner—Kristine Kincaid
Assistant Examiner—Thomas J Joseph
(74) Attorney, Agent, or Firm—David W. Victor; Konrad Raynes & Victor LLP (57) ABSTRACT

Disclosed is a method, system, and program for accessing a shared file system that is accessible to a first computer. The shared file system includes files in at least one file format compatible with at least one application program installed on the first computer. A request is received from an Internet browser program executing on a second computer for an applet over the Internet. The applet is transmitted to the browser program at the second computer. The applet is capable of executing in the browser program at the second computer to display a desktop interface at the second computer and establish a connection with the shared file system. The applet further provides access to at least one desktop application program through the desktop interface that is compatible with at least one application program installed on the first computer system. The desktop application program manipulates files in the same file format as the at least one application program installed on the first computer system.

43 Claims, 3 Drawing Sheets

OTHER PUBLICATIONS

U.S. Ser. No. 08/841,220, filed Apr. 29, 1997.
U.S. Ser. No. 08/972,875, filed Nov. 18, 1997.
U.S. Ser. No. 09/119,124, filed Jul. 7, 1998.
"Remote Driven Remote File Update" IBM Technical Disclosure Bulletin, vol. 40, No. 1, Jan. 1997, pp. 237–238.
"Transmission Control Protocal/Internet Protocol Connection for Virtual Storage Extended/Enterprise Systems Architecture via Service–Call Logical Processor or via Local Area Network Resource Extension and Services" IBM Technical Disclosure Bulletin, vol. 40, No. 05, May 1997, pp. 151–154.
Spangler, Todd. Will Desktop.com Be Your Actual Desktop?, ZDNet: Inter@ctive Week [online], [retrieved on Dec. 10, 1999]. Retrieved from the Internet <URL: http://www-.zdnet.copm/intweek/stories/news/0,4164,2313277, 00.html>.

Clark, Don. The End of Software—How the move from the desktop to the Web will change the way many of us work, The Wall Street Journal, Nov. 15, 1999 [online] [retrieved on Dec. 10, 1999]. Retrieved from the Internet <URL: http://www.desktop.com/site/wsjll–15.html.

"Desktop.com Unveils the First Free Internet Desktop and Application Platform for the Internet" Press [online] [Retrieved on Dec. 10, 1999]. Retrieved from the Internet <URL: http://www.desktop.com/site/presssc.html.

* cited by examiner

METHOD, SYSTEM, AND PROGRAM FOR USING A REMOTELY ACCESSED DESKTOP INTERFACE AND NETWORK DRIVE TO ACCESS A SHARED FILE SYSTEM

BACKGROUND OF THE INVENTION

1. Field of the Invention

A method, system, and program for accessing a shard file system using a remote network drive.

2. Description of the Related Art

One of the current trends in computing is the use of application service providers (ASPs) that deliver application capabilities to multiple entities from data centers across a wide area network, such as the Internet. An ASP may be a commercial entity, providing a paid service to customers or any other organization supporting end users. One such ASP is Desktop.com that allow users to remotely access a desktop interface over the Internet that includes simplified calendering and text editing applications. The user would store data created with the Internet based desktop at a remote site provided by Desktop.com site, which may then be accessed through the Desktop.com application.

Many have heralded web based applications which are accessed remotely over the Internet as a revolutionary concept that will change the entire nature of computing. Internet based computing will allow individuals to avoid having to purchase software that consumes hard disk space and requires advanced processors because the remote computer is performing most of the processing. Thus, with Internet based applications, users do not have to upgrade software and hardware as the software is accessed from centralized locations where updates are automatically available to the remotely served applications. Some have opined that such changes will democratize computing power because people will not have to spend thousands of dollars on computer hardware and software to access applications.

Some of the recent developments in Internet based applications include: Microsoft HotMail that allows users to access an electronic mail program over the Internet and review e-mail, which is stored at the remote HotMail server; Desktop.com and mywebos.com that allow users to access a computer desktop environment over the Internet including basic text editing, e-mail, and other applications. Data created with the applications on the Internet based desktop is stored remotely. Some have suggested that such Internet based desktops could eventually replace the Microsoft Windows environment.

Notwithstanding, current Internet based application services can be inconvenient because a user cannot access the data without going through the Internet based application. Data maintained by the application providers often cannot be shared with multiple users. Further, if a user wants to access data from a home or office system using programs on such home or office system, then often the user must synchronize the files at the application providers storage and the local storage. Thus, users are likely to experience a lack of interoperability and compatibility between current installed systems and the services offered by the Internet based application providers.

As the use of remote, Internet based applications proliferates, there is a need in the art to ensure compatibility and interoperability with current installed platforms.

SUMMARY OF THE PREFERRED EMBODIMENTS

To overcome the limitations in the prior art described above, preferred embodiments disclose a method, system, and program for accessing a shared file system that is accessible to a first computer. The shared file system includes files in at least one file format compatible with at least one application program installed on the first computer. A request is received from an Internet browser program executing on a second computer for an applet over the Internet. The applet is transmitted to the browser program at the second computer. The applet is capable of executing in the browser program at the second computer to display a desktop interface at the second computer and establish a connection with the shared file system. The applet further provides access to at least one desktop application program through the desktop interface that is compatible with at least one application program installed on the first computer system. The desktop application program manipulates files in the same file format as the at least one application program installed on the first computer system.

In further embodiments, accessing the desktop application program through the desktop interface causes the desktop applet to establish communication with a remote application server. The applet provides access from the desktop interface to the desktop application program executing at the remote application server. A file from the shared file system is accessed for use by the desktop application program executing at the remote application server. The accessed file in the shared file system is accessible to the first computer and compatible with at least one application program installed on the first computer system.

Preferred embodiments provide a method, system, and program for using ubiquitous Internet browser technology to provide a user a desktop interface at a remote computer that enables Internet access to data storage that is used by the local system the user has at home or at work. Further, the remote desktop interface of the preferred embodiments enables Internet access to application programs that are compatible with the application programs at the user's local system. The applications available at the remote desktop interface and local system can read and modify files in a compatible file format. Preferred embodiments thus provide interoperability and compatibility for local and remote access to files and applications from different systems.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof and which illustrate several embodiments of the present invention. It is understood that other embodiments may be utilized and structural and operational changes may be made without departing from the scope of the present invention.

Interoperability and Compatibility Problems With Current Web Based Applications

Current web based application programs, such as the programs discussed in the Description of the Related Art section, allow users to access applications and store and access data maintained at a remote server over the Internet. Such Internet based systems work well when the user is at a remote site or is creating data files that the user will only access through the Internet based applications, such as e-mail, personal calendars, personal organizers, etc. However, users often work primarily from a desktop computer at home or work using a few primary applications, such as a word processor, spreadsheet, database programs, etc., and access data from a local hard drive or LAN. Current Internet accessible application programs are not particularly suited for accessing files created using desktop applications. In fact, the desktop storage is typically inaccessible to the Internet based applications. Internet based applications are often designed to access a limited storage area at the provider's server. This often precludes file sharing.

Moreover, if the user wants to access the Internet based data from a local home or office system, then the user may have to copy the files from the application providers storage to the local system. This requires the user to synchronize files to ensure consistency. Having the same files at different locations may also complicate backup and file sharing as the local system may have the most recent version of a file.

Further, data files created with Internet based applications are often not compatible with desktop applications. For instance, the desktop applications create files that are in file formats not compatible with the format capabilities of the Internet based applications and vice versa.

This inherent lack of interoperability and compatibility between desktop systems and Internet based application servers prevents users from sharing files between the systems. Alternatively, users may have to export files from one system and import them to the other, where the files may further have to be transformed into a format compatible with the applications available at the system, i.e., desktop or Internet based, importing the file.

Given the likelihood that most users will continue to rely on desktop applications and systems for some time, there is a need in the art to provide interoperability and compatibility between desktop applications and Internet based applications, at least until the time when Internet bandwidth expands to the point where all programs and data can be quickly and conveniently accessed remotely.

Preferred Embodiments

Figure 1:
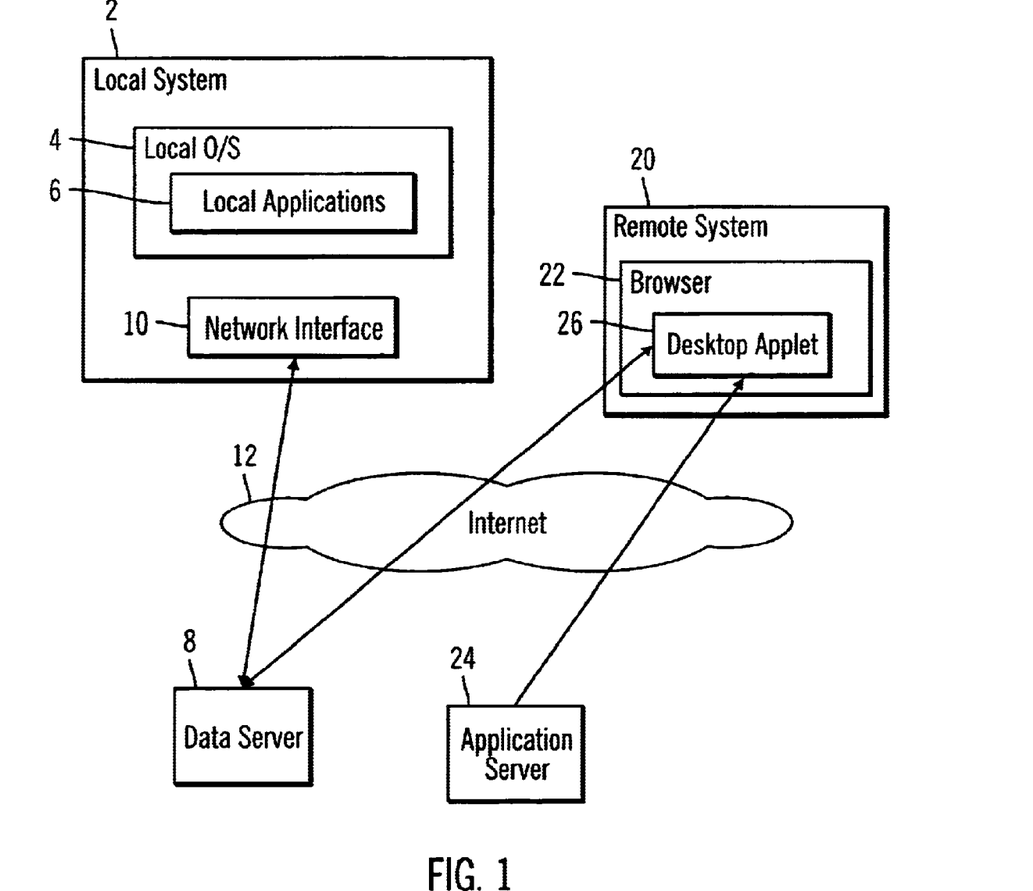
FIG. 1 is a block diagram illustrating a computing environment in which preferred embodiments of the present invention are implemented.

FIG. 1 illustrates a computing environment in which preferred embodiments are implemented. A local system 2 is preferably a fixed location computer at home or work that the user accesses on a regular basis, such as a desktop computer, workstation, etc. The local system 2 includes a local operating system (O/S) 4, such as Windows, IBM OS/2, Linux, etc., and local application programs 6, such as a word processor, spreadsheet, database program, etc. The local operating system 4 and local applications 6 would be installed on the local system 2. The local system 2 further includes a network interface 8 to communicate with a data server 8. The data server 8 provides a distributed file system to client computers including secure and reliable access. The data server 8 may be implemented in a distributed file system such as the Transarc Andrew File System (AFS)** that provides distributed users with a single filespace independent of machine boundaries. In such AFS embodiments, the network interface 8 would comprise the client AFS software to access the data server 8 file system. In this way, files on the data server 8 would be as easily accessible to the local system 2 as files on a local hard drive. AFS provides secure login and authentication, and a secure communication line. The network interface 8 may implement the Samba protocol to communicate with the data server 8 using the TCP/IP protocol. In preferred embodiments, the local system 2 communicates with the data server 8 over the Internet 12. The data server 8 may alternatively include the IBM Distributed Computing Environment (DCE)/Distributed File System (DFS) or the Network File System (NFS) from Sun Microsystems, Inc., which provide data sharing and security services.

**Java is a trademark of Sun Microsystems, Inc; Microsoft is a registered trademark of Microsoft Corporation; OS/2 is a registered trademark of International Business Machines, Corp; Linux is a registered trademark of Linus Torvalds; and Transarc is a registered trademark of the Transarc Corporation.

Preferably, the local system 2 network interface 8 maintains continuous access to the Internet, in the form of a cable modem or DSL line. This would allow the local system 2 to continually have access to the file system of the data server 8. The file system of the data server 8 may be represented as a drive icon in the file system navigation software used in the local system 2. The local system 2 may access the remote data server 8 using any file sharing/transfer protocol known in the art, e.g., Samba, SMB, FTP, NFS, etc.

A remote system 20 is at a location remote from the local system 2. The remote system 20 may be any computing device to which the user of the local system 2 has access, e.g., a computer, at a friend's house, laptop with remote access, other business location, library, etc. The remote system 2 includes a browser 22, which may comprise any Java Enabled Hypertext Mark-Up Language (HTML) ubiquitous browser known in the art capable of accessing documents over the Internet 12 using the Hypertext Transfer Protocol (HTTP). When the user wants to access files from the data server 8, the user would direct the browser 22 to issue a HTTP request to an application server 24, through the browser 22, for a desktop applet 26. The desk top applet 26, which is preferably a Java applet, is capable of executing in the Java enabled browser 22. In preferred embodiments, the browser 22 would communicate via a secure line, such as encrypting data communications by encrypting a browser session with the data server 8 or using the Secure Socket Layer (SSL) protocol.

The desktop applet 26 would further establish a communication line with the data server 8. If the data server 8 is implemented as an AFS file system, then to allow the desktop applet 26 to access the data server 8 through the browser, the data server 8 could utilize the Transarc AFS Web Security Pack, which is a Web server extension that enables system administrators to integrate AFS file systems with selected Web servers. This integration with the data server 8 would allow the browser 22 to access files and directories stored in the AFS filespace of the data server 8. Applications through the desktop applet 26 environment can access and modify files in the data server 8.

In alternative embodiments, the user may access the desktop applet 26 from the data server 8 directly, thereby avoiding the need to access the application server 24. Still further, the application server 24 may function as a gateway between the remote system 20 and data server 28. For instance, the browser 22 could send an HTTP request to the application server 24, which in response would retrieve authenticate the requestor and retrieve the data from the data server 8 to return to the remote system 20.

Figure 2:
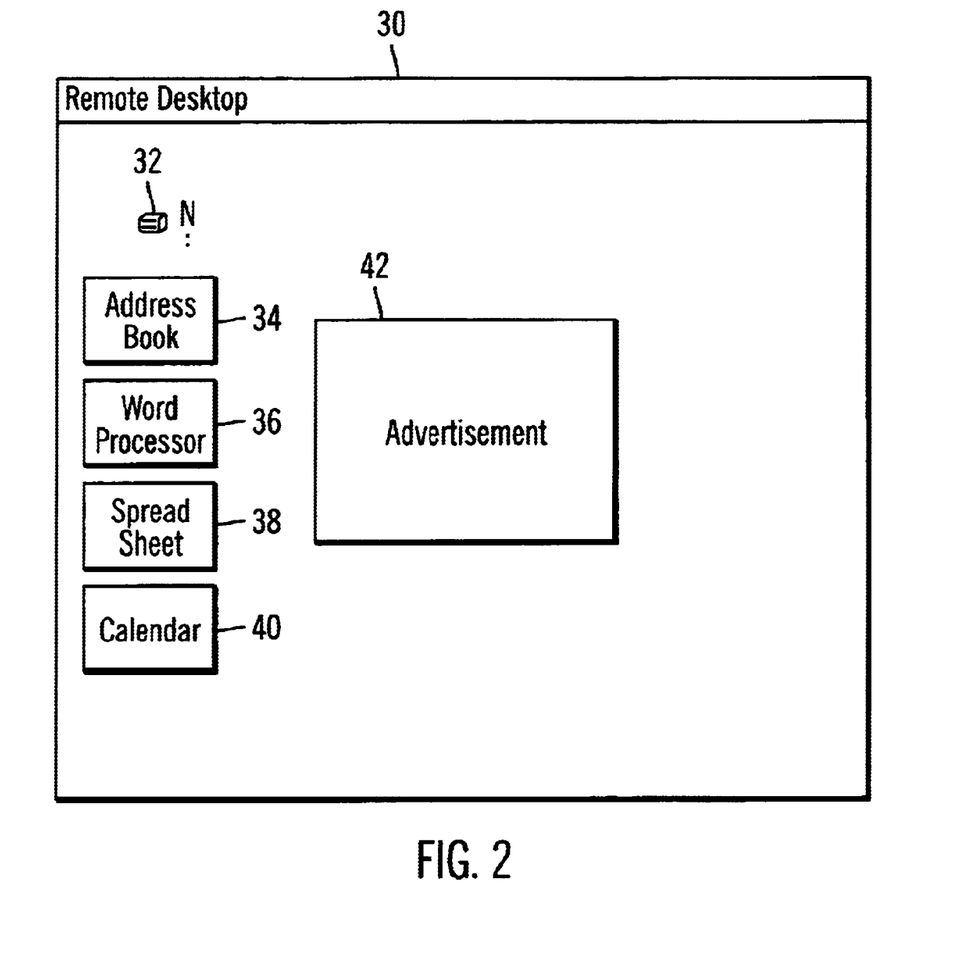
FIG. 2 illustrates a remote desktop environment in accordance with preferred embodiments of the present invention.

FIG. 2 illustrates an example of a remote desktop 30 displayed by the desktop applet 26 to provide access to an entire desktop computing environment and application programs 34, 36, 38, 40. When the user of the desktop applet 26 invokes an application program 34, 36, 38, 40, the desktop applet 26 may then communicate with the application server 24 to provide the application capabilities to the user using Application Service Provider (ASP) technology known in the art. The remote desktop 30 and local system 2 may provide a network drive through which users may access the data server 8. In network drive embodiments, the remote desktop 30 represents the network drive as a displayed drive icon 32 providing a link to the file system in the data server 8. The local computer system 2 would likewise present an icon or link representing the network drive providing access to the file system in the data server 8. The icons displayed on the local system 2 and desktop 30 may be identical, thereby allowing the user to visually recognize that the same data server 8 file system accessible from the local system 2 is also accessible from the remote desktop 30. Alternatively, the network drive of the data server 8 may be represented as a drive letter on both the local 2 and remote 20 systems. The available application programs 34, 36, 38, 40 comprise a personal organizer 34, word processor 36, spread sheet program 38, an e-mail client 40 or any other application program known in the art. These applications 34, 36, 38, 40 could access and modify files from the data server 8.

Alternatively, the network drive providing access to the data server 8 may be represented as a drive letter on both the local 2 and remote 20 systems. In still further embodiments, the network drive may be represented on one system as an icon and another as a drive letter.

In preferred embodiments, user specified desktop settings could be maintained at the application server 24. When the user logs onto the application server 24 and is authenticated, then the user defined settings may be provided with the desktop applet 26 transferred to the remote system 20. The desktop applet 26 could then generate the remote desktop 30 to conform to the user specified settings or previous remote desktop 30 settings in place when the user last terminated a remote desktop 30 session. For instance, the user selection of application programs 32, 34, 36, 38, 40 that are compatible with the local applications 6 could be maintained in the user settings. The desktop applet 26 could automatically place icons for the previously selected remote applications 32, 34, 36, 38, 40 onto the remote desktop 30. In this way, the user automatically returns to the exact desktop environment 30 in the state at the time of the prior access.

In preferred embodiments, the application programs 34, 36, 38, 40 accessible from the remote desktop 30 are compatible with the application programs available from the local system 2. This ensures that when the user at the remote desktop 30 creates or modifies files on the data server 8, the user may then return to the local system 2 and access the modified files as the compatible remote and local applications generate files in the same file format. This aspect provides for full interoperability and compatibility between operations at the local 2 and remote 20 systems. Further, the user may seamlessly access the same files from both the local 2 and remote 20 systems. In preferred embodiments, the user may access the remote desktop 30 from any machine including the browser 22, which is preferably a commonly used Web browser program, e.g., Netscape, Internet Explorer, etc. In this way, the user can be at any machine anywhere that has Internet access and a common browser, and access the remote desktop 30 and accompanying application programs 34, 36, 38, 40 that are compatible with the local application programs 6 the user maintains at the local system 2. The user may also use the desktop interface 30 to access the same files from the data server 8 the user may access from the local system 2. Because a common Internet browser 22 is used, the user does not have to carry portable storage medium, such as disks, be concerned that the remote system 20 the user will be using is compatible with the storage medium the user has, nor worry about forgetting files. Still further, because the remote applications 34, 36, 38, and 40 are compatible with the local applications 6, the user does not have any compatibility concerns when accessing files remotely or that the remote system 20 includes software that will allow access to the data server 8 and application server 24.

With preferred embodiments, data and files created using the remote desktop 30 may be shared with users using other remote desktops 30 or by users at other local 2 or remote 20 systems that can access the data server 8 in the manners described above.

In preferred embodiments, the remote desktop 30 may be provided as a free service to the user. In such case, the company maintaining the data server 8 and application server 24 may cause the display of a digital advertisement 42 on the remote desktop 30 to earn revenue for providing free remote desktop 30 services to registered customers. The advertisement 42 may include a hypertext link to a web site of the advertiser, image, animation, etc. Moreover, the desktop applet 26 can periodically change the advertisements 42 content displayed. Also, advertisements can be displayed when the remote drive is accessed from the local system. Advertisements or sponsor logos can also be displayed as the icons on the desktop representing the drive 32 and or applications 34, 36, 38, 40. For instance, the icons can represent an advertisers logo.

Figure 3:
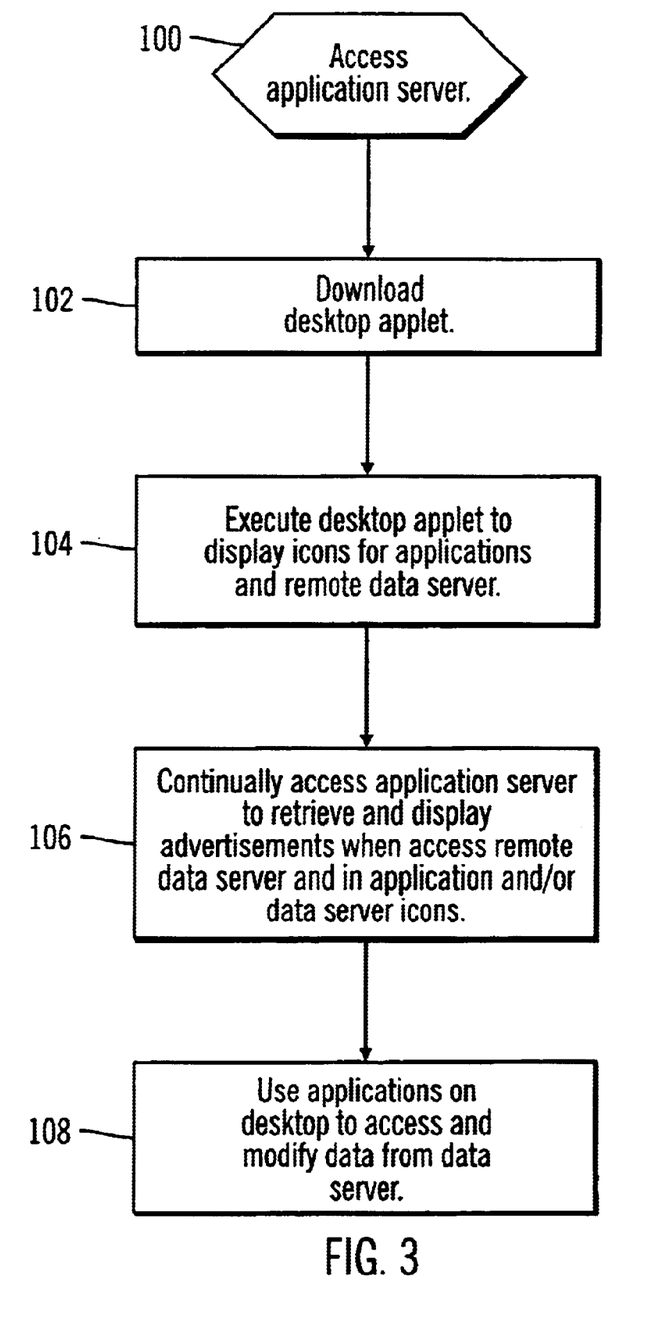
FIG. 3 illustrates logic describing the operation of the desktop interface in accordance with preferred embodiments of the present invention.

FIG. 3 is a flowchart illustrating processing steps performed to access an utilize the remote desktop. Control begins at block 100 with a user accessing the application server 24 to download (at block 102) the desktop applet 26. The user then executes (at block 104) the desktop applet 26 to cause the display of icons 32, 34, 36, 38, and 40 for the remote data server 8 and application programs. While the desktop applet 26 displays the remote desktop 30 interface, the desktop applet 26 will continually communicate with the application server 24 (at block 106) to download advertisements and other information. The advertisements may be displayed whenever the user accesses the remote data server 8 and/or as the icons for the remote drive 32 and application programs 34, 36, 38, and 40. The user may then use (at block 108) the application programs to access and modify data from the data server 8.

Preferred embodiments, thus provide a new model for distributed computing that allows users to work from distributed locations that provide Internet access and a common Internet browser that is interoperable and compatible with the local desktop the user maintains at work or home.

Conclusion and Alternative Embodiments

This concludes the description of the preferred embodiments of the invention. The following describes some alternative embodiments for accomplishing the present invention.

The preferred embodiments may be implemented as a method, apparatus or article of manufacture using standard programming and/or engineering techniques to produce software, firmware, hardware, or any combination thereof. The term "article of manufacture" (or alternatively, "computer program product") as used herein is intended to encompass one or more computer programs and/or data files accessible from one or more computer-readable devices, carriers, or media, such as magnetic storage media, "floppy disk," CD-ROM, optical disks, holographic units, volatile or non-volatile electronic memory, etc. Further, the article of manufacture may comprise the implementation of the preferred embodiments in a transmission media, such as a network transmission line, wireless transmission media, signals propagating through space, radio waves, infrared signals, etc. Of course, those skilled in the art will recognize many modifications may be made to this configuration without departing from the scope of the present invention.

Preferred embodiments described the data server as implemented using the AFS network system. However, in alternative embodiments any distributed file system may be utilized that provides secure and authenticated access and is accessible from remote computers via the Internet. The application server 24 and data server 8 are shown as separate. However, both the application server 24 and data server 8 may be implemented in the same server machine including the network file system.

Preferred embodiments described the desktop applet 26 as implemented as a Java applet. However, the desktop applet 26 that generates the remote desktop 30 and connection with the data server 8 may be implemented in alternative computer languages other than Java and the applet may comprise any application program format known in the art. However, one advantage of using a Java applet is that is executable from most commonly used web browsers.

In summary preferred embodiments disclose a method, system, and program for accessing a shared file system that is accessible to a first computer. The shared file system includes files in at least one file format compatible with at least one application program installed on the first computer. A request is received from an Internet browser program executing on a second computer for an applet over the Internet. The applet is transmitted to the browser program at the second computer. The applet is capable of executing in the browser program at the second computer to display a desktop interface at the second computer and establish a connection with the shared file system. The applet further provides access to at least one desktop application program through the desktop interface that is compatible with at least one application program installed on the first computer system. The desktop application program manipulates files in the same file format as -the at least one application program installed on the first computer system.

The foregoing description of the preferred embodiments of the invention has been presented for the purposes of illustration and description. It is not intended to be exhaustive or limit the invention to the precise form disclosed. Many modifications and variations are possible in light of the above teaching. It is intended that the scope of the invention be -limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for accessing a shared file system that is accessible to a first computer, wherein the shared file system includes files in at least one file format compatible with at least one application program installed on the first computer, comprising:

receiving a request from an Internet browser program executing on a second computer for an applet over the Internet;

transmitting the applet to the browser program at the second computer, wherein the applet is a distinct computer program from the browser program, wherein the applet is capable of executing in the browser program at the second computer to perform:

(i) displaying a desktop interface at the second computer;

(ii) establishing a connection with the shared file system; and (iii) providing access to at least one desktop application proven through the desktop interface that is compatible with at least one application program installed on the first computer system, wherein the desktop application program manipulates files in the same file format as the at least one application program installed on the first computer system, wherein the applet and the desktop application program are different and distinct computer programs, wherein the applet transmitted from the first computer to the second computer is capable of providing access to a file in the shared file system to the desktop application program on the second computer, wherein the desktop application program on the second computer and the one application program on the first computer are of a same application program type, and wherein the applet allows the desktop application program the second computer to manipulate the file in the shared file system in the same file format as the one application program on the first computer.

2. The method of claim 1, wherein accessing the desktop application program through the desktop interface causes the applet to perform:

establishing communication with a remote application server;

providing access from the desktop interface to the desktop application program executing at the remote application server; and accessing a file from the shared file system for use by the desktop application program executing at the remote application server, wherein the accessed file in the shared file system is accessible to the first computer and compatible with at least one application program installed on the first computer system.

3. The method of claim 2, wherein the desktop interface accesses the shared file system through the application server.

4. The method of claim 1, wherein multiple computers are capable of sharing files with the desktop interface through the shared file system.

5. The method of claim 1, wherein the desktop application programs that are compatible with the applications installed on the first computer are members of a set of application programs comprising: word processors; spread sheet programs; personal information managers; personal organizers; e-mail clients; presentation programs; graphics programs; and database application programs.

6. The method of claim 5, further comprising displaying an icon for each application program, wherein at least one application program icon appears as a sponsor logo.

7. The method of claim 1, wherein the applet further performs displaying in the desktop interface an icon representing a remote network drive, wherein selection of the icon representing the remote network drive provides access from the desktop interface to files in the shared file system, wherein the first computer further displays an icon providing access to the shared file system.

8. The method of claim 6, wherein the icon representing the remote network drive displays a sponsor logo.

9. The method of claim 7, wherein the icons displayed on the first and second computers representing access to the shared file system drive are identical.

10. The method of claim 1, wherein the applet further performs presenting the remote network drive as a drive letter.

11. The method of claim 1, further comprising: validating user logon information from the browser program, wherein the applet is not transmitted to the browser program unless the user logon information is validated.

12. The method of claim 1, wherein data traffic among the first computer, second computer, and the shared file system is encrypted.

13. The method of claim 1, wherein the desktop interface is customized for a user of the second computer.

14. The method of claim 13, wherein the desktop interface is used exclusively by the user.

15. The method of claim 1, wherein the desktop interface, the at least one desktop application program and the applet are different computer programs.

16. A system for accessing a shared file system that is accessible to a first computer, wherein the shared file system includes files in at least one file format compatible with at least one application program installed on the first computer, comprising:
   means for receiving a request from an Internet browser program executing on a second computer for a desktop over the Internet;
   means for transmitting the applet to the browser program at the second computer, wherein the applet is a distinct computer program from the browser program, wherein the applet is capable of executing in the browser program at the second computer and includes:
      (i) means for displaying a desktop interface at the second computer;
      (ii) means for establishing a connection with the shared file system; and
      (iii) means for providing access to at least one desktop application program through the desktop interface that is compatible with at least one application program installed on the first computer system, wherein the desktop application program manipulates files in the same file format as the at least one application program installed on the first computer system, wherein the applet and the desktop application program are different and distinct computer programs, wherein the applet transmitted from the first computer to the second computer is capable of providing access to a file in the shared file system to the desktop application program on the second computer, wherein the desktop application program on the second computer and the one application program on the first computer are of a same application program type, and wherein the applet allows the desktop application program on the second computer to manipulate the file in the shared file system in the same file format as the one application program on the first computer.

17. The system of claim 16, wherein the applet further comprises:
   means for establishing communication with a remote application server;
   means for providing access from the desktop interface to the desktop application program executing at the remote application server; and
   means for accessing a file from the shared file system for use by the desktop application program executing at the remote application server, wherein the accessed file in the shared file system is accessible to the first computer and compatible with at least one application program installed on the first computer system.

18. The system of claim 16, wherein the desktop interface accesses the shared file system through the application server.

19. The system of claim 16, wherein multiple computers are capable of sharing files with the desktop interface through the shared file system.

20. The system of claim 16, wherein the desktop application programs that are compatible with the applications installed on the first computer are members of a set of application programs comprising: word processors; spread sheet programs; personal information managers; personal organizers; e-mail clients; presentation programs; graphics programs; and database application programs.

21. The system of claim 20, further comprising displaying an icon for each application program, wherein at least one application program icon appears as a sponsor logo.

22. The system of claim 16, wherein the applet further performs displaying in the desktop interface an icon representing a remote network drive, wherein selection of the icon representing the remote network drive provides access from the desktop interface to files in the shared file system, wherein the first computer further displays an icon providing access to the shared file system.

23. The system of claim 22, wherein the icon representing the remote network drive displays a sponsor logo.

24. The system of claim 22, wherein the icons displayed on the first and second computers representing access to the shared file system are identical.

25. The system of claim 16, wherein the applet further performs presenting the remote network drive as a drive letter.

26. The system of claim 16, further comprising: validating user logon information from the browser program, wherein the applet is not transmitted to the browser program unless the user logon information is validated.

27. The system of claim 16, wherein data traffic among the first computer, second computer, and the shared file system is encrypted.

28. The system of claim 16, wherein the desktop interface is customized for a user of the second computer.

29. The system of claim 28, wherein the desktop interface is used exclusively by the user.

30. The system of claim 16, wherein the desktop interface, the at least one desktop application program and the applet are different computer programs.

31. An article of manufacture for accessing a shared file system that is accessible to a first computer, wherein the shared file system includes files in at least one file format compatible with at least one application program installed on the first computer, the article of manufacture comprising computer useable media accessible to the computer system, wherein the computer usable media includes at least one applet program that is capable of executing in an Internet browser program to cause a second computer to perform:
   displaying a desktop interface at the second computer;
   establishing a connection with the shared file system; and
   providing access to at least one desktop application program trough the desktop interface that is compatible with at least one application program installed on the first computer system, wherein the desktop application program manipulates files in the same file format as the at least one application program installed on the first computer system, wherein the applet and the desktop application program are different and distinct computer programs, wherein the applet is a distinct computer program from the browser program, wherein the applet transmitted form the first computer to the second computer is capable of providing access to a file in the shared file system to the desktop application program on the second computer, wherein the desktop application program on the second computer and the one application program on the first computer are of a same application program type, and wherein the applet allows the desktop application program on the second computer to manipulate the file in the shared file system in the same file format as the one application program on the first computer.

32. The article of manufacture of claim 31, wherein accessing the desktop application program through the desktop interface causes the applet to perform:

establishing communication with a remote application server;

providing access from the desktop interface to the desktop application program executing at the remote application server; and accessing a file from the shared file system for use by the desktop application program executing at the remote application server, wherein the accessed file in the shared file system is accessible to the first computer and compatible with at least one application program installed on the first computer system.

33. The article of manufacture of claim 32, wherein the desktop interface accesses the shared file system through the application server.

34. The article of manufacture of claim 31, wherein multiple computers are capable of sharing files with the desktop interface through the shared file system.

35. The article of manufacture of claim 31, wherein the desktop application programs that are compatible with the applications installed on the first computer are members of a set of application programs comprising: word processors; spread sheet programs; personal information managers; personal organizers; e-mail clients; presentation programs; graphics programs; and database application programs.

36. The article of manufacture of claim 35, further comprising displaying an icon for each application program, wherein at least one application program icon appears as a sponsor logo.

37. The article of manufacture of claim 31, wherein the applet further performs displaying in the desktop interface an icon representing a remote network drive, wherein selection of the icon representing the remote network drive provides access from the desktop interface to files in the shared file system, wherein the first computer further displays an icon providing access to the shared file system.

38. The article of manufacture of claim 37, wherein the icon representing the remote network drive displays a sponsor logo.

39. The article of manufacture of claim 37, wherein the icons displayed on the first and second computers representing access to the shared file system are identical.

40. The article of manufacture of claim 31, wherein the applet further performs presenting the remote network drive as a drive letter.

41. The article of manufacture of claim 31, wherein the desktop interface is customized for a user of the second computer.

42. The article of manufacture of claim 41, wherein the desktop interface is used exclusively by the user.

43. The article of manufacture of claim 31, wherein the desktop interface, the at least one desktop application program and the applet are different computer programs.

* * * * *